(12) United States Patent
Heuiser

(10) Patent No.: US 7,469,917 B1
(45) Date of Patent: Dec. 30, 2008

(54) BOAT TRAILER FOR TUNNEL HULL SPEED BOATS

(76) Inventor: Carl Heuiser, 1606 Highway B, Poplar Bluff, MO (US) 63901

( * ) Notice: Subject to any disclaimer, the term of this patent is extended or adjusted under 35 U.S.C. 154(b) by 354 days.

(21) Appl. No.: 11/416,020

(22) Filed: May 2, 2006

(51) Int. Cl.
*B60P 3/071* (2006.01)
(52) U.S. Cl. .................. 280/414.3; 280/414.1
(58) Field of Classification Search ............ 280/414.1, 280/414.2, 414.3, 414.5; 414/482, 483, 678
See application file for complete search history.

(56) References Cited

U.S. PATENT DOCUMENTS

| | | | |
|---|---|---|---|
| 4,801,153 A * | 1/1989 | Wilson | ............... 280/414.1 |
| 5,316,329 A | 5/1994 | MacKarvich | |
| 5,429,383 A | 7/1995 | Reed | |
| 5,458,078 A | 10/1995 | Perette | |
| 6,257,167 B1 * | 7/2001 | Joaquim | ............... 114/344 |
| 6,648,578 B1 * | 11/2003 | Rouse | ............... 414/482 |
| 6,663,130 B1 * | 12/2003 | Dray | ............... 280/414.3 |
| 6,722,683 B1 * | 4/2004 | Heuiser | ............... 280/414.1 |

\* cited by examiner

*Primary Examiner*—Tony H. Winner
(74) *Attorney, Agent, or Firm*—Polster, Lieder, Woodruff & Lucchesi, L.C.

(57) ABSTRACT

In a boat trailer for hauling a tunnel hull speed boat, wheels revolvably mounted on a cradle on which the boat rests are arranged to allow the periphery of the wheels to engage the overhead of the tunnel of the boat to permit the boat to roll easily from the trailer when released to do so, and to be easily mounted on the trailer from the water when the boat is afloat. The wheels are preferably mounted on stanchions, and arranged to be raised to the overhead engaging position from a position at which the wheels are not supporting the boat.

13 Claims, 2 Drawing Sheets

BOAT TRAILER FOR TUNNEL HULL SPEED BOATS

CROSS-REFERENCE TO RELATED APPLICATIONS

This application contains subject matter common to U.S. Pat. No. 6,722,683.

STATEMENT REGARDING FEDERALLY SPONSORED RESEARCH

Not Applicable.

BACKGROUND OF THE INVENTION

Over-the-road trailers of the type described in U.S. Pat. No. 6,722,683, and similar trailers manufactured by Myco Industries, Bradenton, Florida, have a wheeled frame and a tiltable cradle carried by the frame, upon which the tunnel hull speed boat rests. Heretofore, in order to launch a boat from such a trailer, it has been necessary to back the trailer into the water until the boat floats, in order to get the boat off the trailer. This has meant backing the trailer a long way into the water, depending upon the slope of the launching ramp and the depth of the water. In retrieving the boat from the water, the trailer needs to be backed even farther into the water, so as to permit the boat to float most of the way to the front of the trailer.

Trailers for hauling flat bottomed or v-bottomed boats have been known heretofore equipped with rollers, to permit the boat to be launched, see for example, U.S. Pat. No. 5,316,329. Tunnel hull boats present different problems.

BRIEF SUMMARY OF THE INVENTION

In accordance with this invention, generally stated, a boat trailer designed to carry a tunnel hull speed boat is provided, in which the boat is carried on a cradle, which is equipped with wheels, preferably mounted so as to clear the hull of the speed boat when the boat is being transported, but to engage the hull to permit it to roll easily, when the boat is being launched, and to be retrieved readily.

DESCRIPTION OF THE PREFERRED EMBODIMENT

Figure 1:
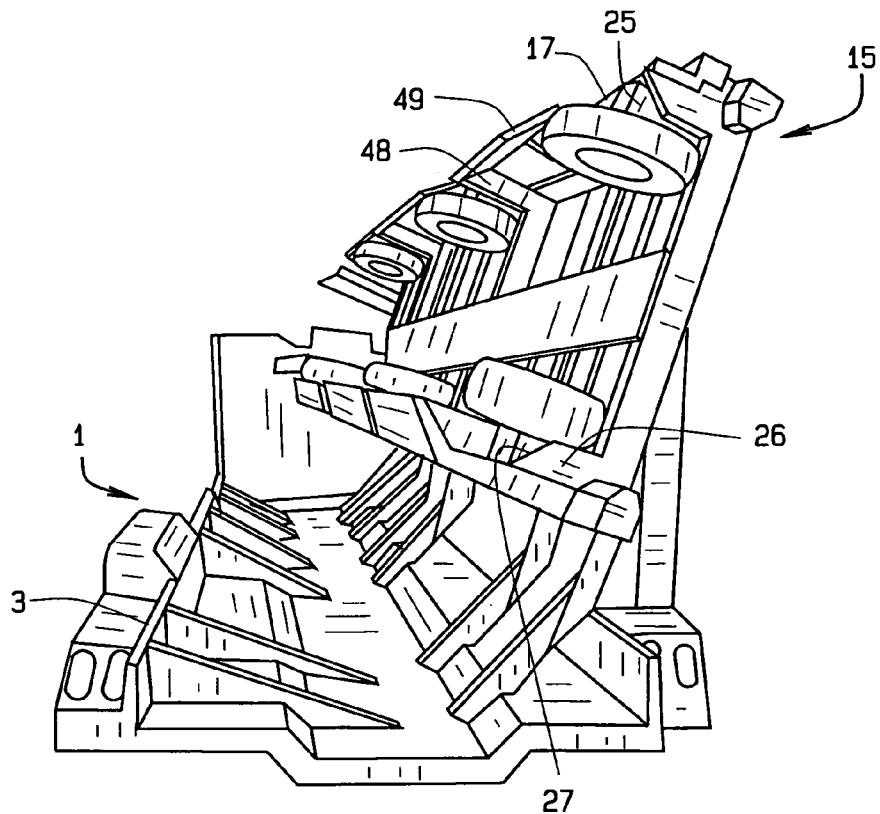
FIG. 1 is a view in rear elevation of a trailer frame and tiltable cradle of one illustrative embodiment of this invention.
Figure 2:
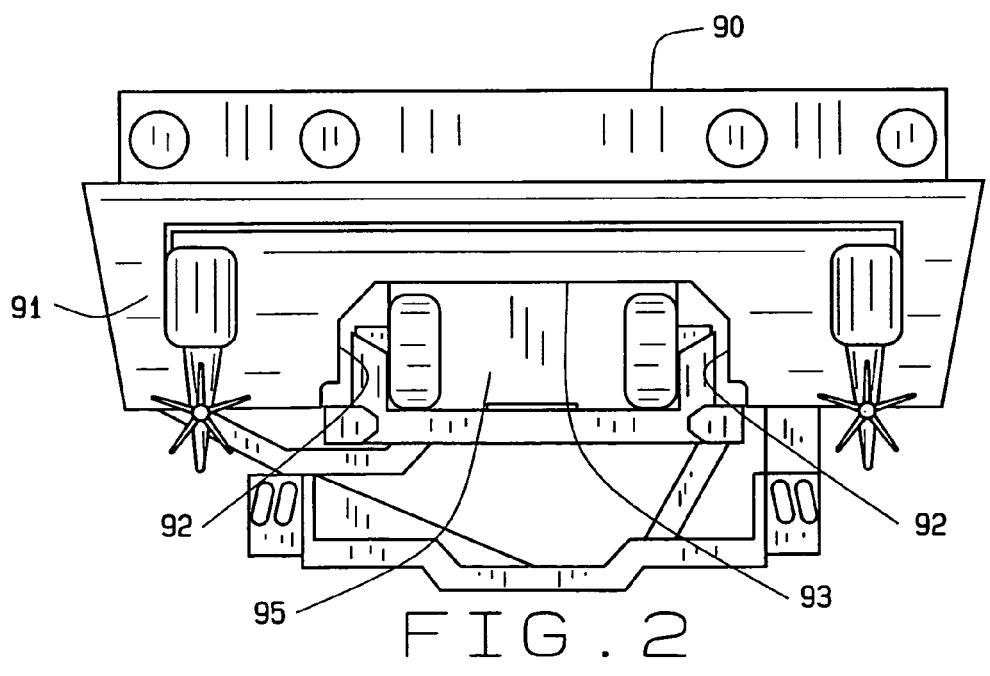
FIG. 2 is a view in rear elevation of the frame and cradle of FIG. 1 in a lowered position with a tunnel hull speed boat supported on the cradle.
Figure 3:
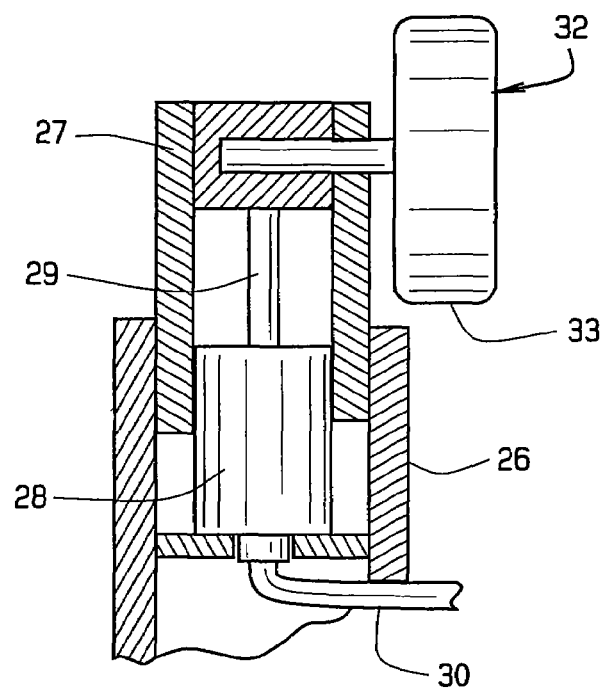
FIG. 3 is a somewhat diagrammatic fragmentary sectional view of a stanchion with a wheel in raised position.
Figure 4:
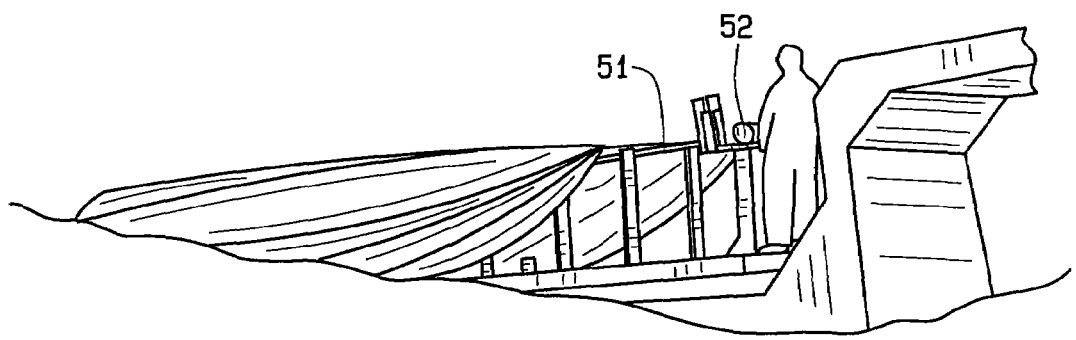
FIG. 4 is a fragmentary view of the boat in the process of launching or retrieval.

Referring now to the drawings for one illustrative embodiment of this invention, a trailer 1 has a frame 3 which can be the same as the frame shown in U.S. Pat. No. 6,722,683. The frame 3 carries a cradle 15, which, like the cradle 15 of U.S. Pat. No. '683 is arranged to be titled. However, the tilting mechanism can be of the type, for example, as manufactured by Myco Industries, the tilting mechanism per se forming no part of this invention.

The cradle 15 carries a tunnel hull boat 90 with a pair of spaced sponsons 91, between which is a tunnel 95. The tunnel 95 is defined by inboard sidewalls 92 of the sponsons 91 and an overhead 93 between them. The cradle 15 has heavy side rails 17, and stakes 48, topped by spaced fenders 49. The fenders 49 engage the tunnel 95 at the junctures of inside walls 92 and overhead 93. Stanchions 25 are spaced along both sides of the cradle along the length of the cradle within spaces between the fenders 49. The stanchions 25 are made in two parts, a lower part 26 welded to the rails 17 and cross beams 19 inboard of the stakes 48, and an upper part 27 slidably mounted on the lower part. The lower part 26 has inside it a hydraulic cylinder 28, connected by hydraulic lines 30 to a suitable source of hydraulic fluid under pressure, not here shown. Each of the cylinders carries a piston 29. In this, preferred embodiment, for the launch, the throw of the pistons at the front end of the cradle is greater than the throw of the pistons at the rear end, and the throws of the pistons in intermediate stanchions are suitably long enough to make them form a linear slope from bow to stern. The pistons 29 are connected to the upper parts 27 of the stanchions. The upper parts 27 carry stub shafts on which wheels 32 are revolvably mounted. The wheels carry automotive type pneumatic tires 33. The wheels and tires can be of the sort commonly used on trailers, for example. Because the wheels 32 and tires 33 are all of the same diameter, when the pistons are extended, the overhead, hence the boat itself, slopes toward the stern, and is therefore gravity biased to roll off the cradle, being restrained in this embodiment, by a cable (in this case, a heavy strapping) 51 on a winch 52 mounted on a post carried by a cross-bar at the bow end of the cradle. The winch can either be manually operated, or motor, hydraulic or electric, driven. The cable is paid out to provide a smoothly controlled launch, and, when reattached to the boat, retracted to provide a smooth restoration of the boat to the cradle. The pistons 29 of the rear cable wheels may be extended farther at retrieval that at launch, and may even be extended to slope downwardly from the rear to the front of the cradle for the retrieval, to facilitate the work of the winch, and to avoid damaging the propellers. Numerous variations in the construction and operation of the trailer of this invention within the scope of the amended claims will occur to those skilled in the art in the light of the foregoing disclosure. Merely by way of example, the raising and lowering mechanism can be mechanical, as for example, rack and pinion or screw type, or jack or pentagraph type mechanisms, but the hydraulic system described is by far the preferred one, for simplicity, reliability, ease of maintenance, and durability. The wheels can be equipped with brakes to assist in controlling the rate of launch, or, if the tires are kept in contact with the tunnel overhead, to hold the boat firmly in place. The wheels can be made of heavy plastic, for example or spoked tires with solid rubber rims, and be of any practical diameter and length, to what amount to rollers, but again, the wheels and tires shown are the preferred wheels, because they are readily available, effective, and reliable. Elements of the invention described are useful in trailers in which the cradle is not tiltable, for example, the programmable cradle wheel heights, or cradle wheels equipped with brakes. A belt or a plurality of belts can be run over the wheels and either moved in response to frictional engagement with the bottom of the boat, or be driven by a motor operatively connected to a wheel around which the belt extends. In such an arrangement, the wheels do not engage the boat's bottom directly, but through the belt. Nevertheless, as used herein, the periphery of the wheels engaging the bottom of the boat includes the engagement by way of a belt supported by the wheels. The belt will be raised and lowered by the wheels as the wheels are raised and lowered. These are merely illustrative.

The invention claimed is:

1. In a boat trailer for hauling a tunnel hull speed boat having spaced sponsons with inner side walls, and a substantially planar overhead between said sponsons, defining with said inner side walls, a tunnel, said trailer having a wheeled frame and a cradle, carried by said frame, on which said boat is seated, the improvement comprising cradle wheels revolvably mounted on said cradle inboard of said inner side walls to allow a periphery of said cradle wheels to engage said overhead of said tunnel to permit the boat to roll easily from the trailer when released to do so, and to be easily mounted on said trailer from the water when the boat is afloat.

2. The improvement of claim 1 including means for tilting said cradle.

3. The improvement of claim 2 wherein said cradle wheels are carried on stanchions mounted inboard of said inner walls, said cradle wheels are mounted inboard of said stanchions, and means are provided on said stanchions for raising said cradle wheels from a position at which said cradle wheels are out of engagement with said overhead to a position at which said cradle wheels engage said overhead.

4. The improvement of claim 3 wherein the stanchions are hollow, one part being fixedly secured to the frame and another part being slidably mounted on said fixed part, and said means for raising said cradle wheels are at least partly enclosed in said fixed part.

5. The improvement of claim 4 wherein a hydraulic cylinder and piston constitute the raising means, the piston being connected to the sliding member of the stanchion.

6. The improvement of claim 1 including means provided for raising said cradle wheels from a position at which said cradle wheels are out of engagement with said overhead to a position at which said cradle wheels engage said overhead.

7. The improvement of claim 6 wherein the means for raising said cradle wheels are hydraulic.

8. The improvement of claim 7 wherein the hydraulic means for raising said cradle wheels are programmed to raise cradle wheels at a bow higher than cradle wheels at a stern of the boat at launching.

9. The improvement of claim 6 wherein the means for raising said cradle wheels are programmed to raise cradle wheels at the bow higher than cradle wheels at the stern of the boat, and to raise cradle wheels intermediate said wheels at a bow and stern an appropriate intermediate distance.

10. The improvement of claim 6 wherein the means for raising said cradle wheels are programmed to raise cradle wheels at a bow higher than cradle wheels at a stern of the boat at launching, said cradle wheels at the stern being raised higher during retrieval of the boat than during the launch of the boat, and cradle wheels intermediate said cradle wheels at the bow and stern are raised an appropriate intermediate distance.

11. The improvement of claim 6 wherein the means for raising said cradle rails are programmed to raise cradle wheels at a bow higher than cradle wheels at a stern of the boat at launching.

12. The improvement of claim 1 wherein the cradle wheels are automotive wheels and the tires are pneumatic.

13. In a boat trailer for hauling a tunnel hull speed boat having spaced sponsons with inner side walls and a substantially planar overhead between said sponsons, defining with said inner side walls, a tunnel, said trailer having a wheeled frame, a cradle, carried by said frame, on which said boat is seated, and means for tilting said cradle, the improvement comprising automotive wheels with pneumatic tires revolvably carried on stanchions mounted on said cradle inboard of said inner walls, said wheels being mounted inboard of said stanchions, the stanchions being hollow, one part being fixedly secured to the frame and another part being slidably mounted on said fixed part, and hydraulic means for raising said wheels having a cylinder at least partly enclosed in said fixed part of said stanchions and a piston connected to said sliding part for raising said wheels from a position at which said wheels are out of engagement with said overhead to a position at which said wheels engage said overhead of said tunnel, the means for raising said wheels being programmed to raise wheels at a bow higher than wheels at a stern of the boat at launching, and to raise said wheels at the stern higher during retrieval of the boat than during the launch of the boat, and to raise the wheels intermediate said wheels at the bow and stern an appropriate intermediate distance to permit the boat to roll easily from the trailer when released to do so, and to be easily mounted on said trailer from the water when the boat is afloat.

* * * * *